(12) United States Patent
Hassan et al.

(10) Patent No.: US 9,850,437 B2
(45) Date of Patent: Dec. 26, 2017

(54) ENHANCED PROCESSES TO PRODUCE VALUE-ADDED PRODUCTS FROM LIGHT GASES

(71) Applicant: H R D Corporation, Sugar Land, TX (US)

(72) Inventors: Abbas Hassan, Sugar Land, TX (US); Aziz Hassan, Sugar Land, TX (US); Rayford G. Anthony, College Station, TX (US); Gregory G. Borsinger, Chatham, NJ (US)

(73) Assignee: H R D Corporation, Houston, TX (US)

( * ) Notice: Subject to any disclaimer, the term of this patent is extended or adjusted under 35 U.S.C. 154(b) by 655 days.

(21) Appl. No.: 14/463,858

(22) Filed: Aug. 20, 2014

(65) Prior Publication Data

US 2015/0068953 A1    Mar. 12, 2015

Related U.S. Application Data

(60) Provisional application No. 61/876,074, filed on Sep. 10, 2013.

(51) Int. Cl.
*C10G 49/20* (2006.01)
*C10G 49/22* (2006.01)
(Continued)

(52) U.S. Cl.
CPC .......... *C10G 49/22* (2013.01); *B01F 7/00766* (2013.01); *B01F 13/1016* (2013.01);
(Continued)

(58) Field of Classification Search
CPC ........ C10G 47/24–47/26; C10G 47/32–47/34; C10G 49/10–49/12; C10G 49/18–49/22
See application file for complete search history.

(56) References Cited

U.S. PATENT DOCUMENTS 3,887,167 A    6/1975  Irwin
4,416,767 A *  11/1983 Jordan ................... B01D 17/02
                                                       208/262.1
(Continued)

FOREIGN PATENT DOCUMENTS

WO    2002064708 A2    8/2002

OTHER PUBLICATIONS

Search Report and Written Opinion dated Dec. 1, 2014 for International Application No. PCT/US2014/051809 (15 pgs.).
(Continued)

*Primary Examiner* — Renee Robinson
(74) *Attorney, Agent, or Firm* — Timothy S. Westby; Porter Hedges LLP (57) ABSTRACT

Herein disclosed is a method of producing value-added product from light gases, the method comprising: (a) providing light gases comprising at least one compound selected from the group consisting of C1-C6 compounds and combinations thereof; (b) intimately mixing the light gases with a liquid carrier in a high shear device to form a dispersion of gas in the liquid carrier, wherein the dispersion is supersaturated with the light gases and comprises gas bubbles at least some of which have a mean diameter of less than or equal to about 5 micron(s); (c) allowing the value-added product to form and utilizing vacuum to extract unreacted light gases from the liquid carrier; (d) extracting the value-added product; wherein the value-added product comprises at least one component selected from the group consisting of higher hydrocarbons, hydrogen, olefins, alcohols, aldehydes, and ketones. A system for producing value-added product from light gases is also disclosed.

10 Claims, 4 Drawing Sheets

(51) Int. Cl.
| | |
|---|---|
| C10G 49/10 | (2006.01) |
| C01B 3/26 | (2006.01) |
| C10G 45/00 | (2006.01) |
| C10G 45/02 | (2006.01) |
| C10G 45/12 | (2006.01) |
| C10G 47/00 | (2006.01) |
| C10G 47/24 | (2006.01) |
| C10G 50/00 | (2006.01) |
| C10G 2/00 | (2006.01) |
| C10G 9/00 | (2006.01) |
| B01J 8/22 | (2006.01) |
| B01J 19/18 | (2006.01) |
| B01F 7/00 | (2006.01) |
| B01F 13/10 | (2006.01) |
| C01B 3/22 | (2006.01) |
| C01B 3/24 | (2006.01) |
| C01B 3/50 | (2006.01) |

(52) U.S. Cl.
CPC .......... *B01J 8/222* (2013.01); *B01J 19/1806* (2013.01); *C01B 3/22* (2013.01); *C01B 3/24* (2013.01); *C01B 3/26* (2013.01); *C01B 3/50* (2013.01); *C10G 2/30* (2013.01); *C10G 2/342* (2013.01); *C10G 9/00* (2013.01); *C10G 45/00* (2013.01); *C10G 45/02* (2013.01); *C10G 45/12* (2013.01); *C10G 47/00* (2013.01); *C10G 47/24* (2013.01); *C10G 49/10* (2013.01); *C10G 49/20* (2013.01); *C10G 50/00* (2013.01); *B01J 2208/00283* (2013.01); *B01J 2219/0011* (2013.01); *B01J 2219/00189* (2013.01); *C01B 2203/0272* (2013.01); *C01B 2203/0277* (2013.01); *C01B 2203/10* (2013.01); *C01B 2203/1041* (2013.01); *C01B 2203/1235* (2013.01); *C01B 2203/1241* (2013.01); *C01B 2203/1247* (2013.01); *C01B 2203/1276* (2013.01); *C01B 2203/148* (2013.01)

(56) References Cited

U.S. PATENT DOCUMENTS

| | | | |
|---|---|---|---|
| 4,927,977 | A | 5/1990 | Child et al. |
| 5,538,191 | A | 7/1996 | Holl |
| 5,877,350 | A | 3/1999 | Langer et al. |
| 6,241,472 | B1 | 6/2001 | Bosch et al. |
| 6,368,366 | B1 | 4/2002 | Langer et al. |
| 6,368,367 | B1 | 4/2002 | Langer et al. |
| 6,383,237 | B1 | 5/2002 | Langer et al. |
| 6,530,964 | B2 | 3/2003 | Langer et al. |
| 6,742,774 | B2 | 6/2004 | Holl |
| 6,752,529 | B2 | 6/2004 | Holl |
| 7,165,881 | B2 | 1/2007 | Holl |
| 7,538,237 | B2 | 5/2009 | Holl |
| 8,235,119 | B2 | 8/2012 | Hoskins |
| 2009/0000989 | A1 | 1/2009 | Hassan et al. |
| 2009/0001316 | A1 | 1/2009 | Hassan et al. |
| 2009/0003126 | A1* | 1/2009 | Hassan ............... B01F 7/00766 366/176.1 |
| 2011/0028573 | A1 | 2/2011 | Hassan et al. |

OTHER PUBLICATIONS

IKA-Rotor-Stator Generators—2003 Processing Catalog (38 pgs.).
Gogate, et al. "Cavitation: A technology on the horizon," Current Science 91, No. 1, Jul. 2006, pp. 35-46 (12 pgs.).
Office Action dated Jun. 25, 2009 for U.S. Appl. No. 12/142,447 (10 pgs.).
Office Action dated Jan. 7, 2010 for U.S. Appl. No. 12/142,447 (6 pgs.).
Office Action dated May 13, 2010 for U.S. Appl. No. 12/142,447 (5 pgs.).
Office Action dated Feb. 4, 2010 for U.S. Appl. No. 12/492,721 (5 pgs.).
Office Action dated Feb. 18, 2010 for U.S. Appl. No. 12/635,433 (6 pgs.).
Office Action dated Feb. 18, 2010 for U.S. Appl. No. 12/635,454 (6 pgs.).
Office Action dated May 14, 2010 for U.S. Appl. No. 12/137,441 (15 pgs.).
Office Action dated Feb. 19, 2010 for U.S. Appl. No. 12/144,459 (10 pgs.).
Office Action dated Sep. 2, 2009 for U.S. Appl. No. 12/142,433 (11 pgs.).
Office Action dated Jan. 29, 2010 for U.S. Appl. No. 12/142,433 (8 pgs.).
Office Action dated May 24, 2011 for U.S. Appl. No. 12/142,433 (10 pgs.).
Office Action dated Apr. 30, 2010 for U.S. Appl. No. 12/141,191 (12 pgs.).
Office Action dated Oct. 27, 2009 for U.S. Appl. No. 12/142,120 (15 pgs.).
Office Action dated May 5, 2010 for U.S. Appl. No. 12/571,537 (12 pgs.).
Office Action dated Feb. 24, 2011 for U.S. Appl. No. 12/796,358 (13 pgs.).
Office Action dated Feb. 29, 2012 for U.S. Appl. No. 12/146,733 (8 pgs.).
Office Action dated Jun. 3, 2011 for U.S. Appl. No. 12/568,155 (11 pgs.).
Office Action dated Jun. 2, 2011 for U.S. Appl. No. 12/427,286 (12 pgs.).
Office Action dated Jun. 3, 2011 for U.S. Appl. No. 12/568,280 (16 pgs.).
IKA-DRS Reactors website http://www.ikausa.com/dr.him, on Sep. 8, 2010 (2 pgs.).
Chattopadhyay et al., "Understanding Mechanical Energy Driven Nonequilibrium Processing: Some Results, Eleventh International Conference on Rapidly Quenched and Metastable Materials," A Material Science and Engineering, vol. 375-377, dated Jul. 15, 2004, pp. 72-77 (9 pgs.)

* cited by examiner

ENHANCED PROCESSES TO PRODUCE VALUE-ADDED PRODUCTS FROM LIGHT GASES

CROSS-REFERENCE TO RELATED APPLICATIONS

This application claims the benefit under 35 U.S.C. §119(e) of U.S. Provisional Patent Application No. 61/876,074 filed Sep. 10, 2013, the disclosure of which is hereby incorporated herein by reference.

STATEMENT REGARDING FEDERALLY SPONSORED RESEARCH OR DEVELOPMENT

Not Applicable.

BACKGROUND

Technical Field

The present invention relates generally to production of value-added products from light gases. More particularly, the present invention relates to a system and process for producing products via shear-promoted reactions and/or vacuum-assisted extractions.

Background of the Invention

There are many processes that produce value-added products, such as gas to liquids (GTL) processes, fluid catalytic cracking (FCC) processes, and coal liquefaction processes. Coal liquefaction is a general term referring to a family of processes for producing liquid fuels from coal. Specific liquefaction technologies generally fall into two categories: direct (DCL) and indirect liquefaction (ICL) processes. Indirect liquefaction processes generally involve gasification of coal to a mixture of carbon monoxide and hydrogen (syngas) and then using a process such as Fischer-Tropsch to convert the syngas mixture into liquid hydrocarbons. By contrast, direct liquefaction processes convert coal into liquids directly, without the intermediate step of gasification, by breaking down its organic structure with application of solvents or catalysts in a high pressure and temperature environment. Since liquid hydrocarbons generally have a higher hydrogen-carbon molar ratio than coals, either hydrogenation or carbon-rejection processes must be employed in both ICL and DCL technologies. Hydrogen is a valuable product for many hydrogenation processes.

Fluid catalytic cracking (FCC) is one of the most important conversion processes used in petroleum refineries. It is widely used to convert the high-boiling, high-molecular weight hydrocarbon fractions of petroleum crude oils to more valuable gasoline, olefinic gases, and other products. Cracking of petroleum hydrocarbons was originally done by thermal cracking, which has been almost completely replaced by catalytic cracking because it produces more gasoline with a higher octane rating. It also produces byproduct gases that are more olefinic, and hence more valuable, than those produced by thermal cracking.

Gas to liquids (GTL) is a refinery process to convert natural gas or other gaseous hydrocarbons into longer-chain hydrocarbons such as gasoline or diesel fuel. Methane-rich gases are converted into liquid synthetic fuels either via direct conversion or via syngas as an intermediate, for example using the Fischer Tropsch or Mobil processes.

Within such existing processes, there is the need to improve the utilization and conversion of light gases, such as methane, to generate value-added products. Desirably, the conversion is such that the conversion of the light gases to value-added products is economically beneficial. Desirably, the system and process may be incorporated into existing processes.

SUMMARY

Herein disclosed is a method of producing value-added product from light gases, the method comprising: (a) providing light gases comprising at least one compound selected from the group consisting of C1-C6 compounds and combinations thereof; (b) intimately mixing the light gases with a liquid carrier in a high shear device to form a dispersion of gas in the liquid carrier, wherein the dispersion is supersaturated with the light gases and comprises gas bubbles at least some of which have a mean diameter of less than or equal to about 5 micron(s); (c) allowing the value-added product to form and utilizing vacuum to extract unreacted light gases from the liquid carrier; and (d) extracting the value-added product; wherein the value-added product comprises at least one component selected from the group consisting of higher hydrocarbons, hydrogen, olefins, alcohols, aldehydes, and ketones.

In some embodiments, the method further comprises recycling the extracted unreacted light gases. In some embodiments, at least a portion of the liquid carrier is converted into the value-added product.

In some embodiments, the liquid carrier comprises a catalyst. In some embodiments, step (b) further comprises contacting the light gases and the liquid carrier with a catalyst. In some embodiments, the method further comprises contacting the liquid carrier and the light gases with a catalyst selected from the group consisting of hydrogenation catalysts, hydroxylation catalysts, partial oxidation catalysts, hydrodesulfurization catalysts, hydrodenitrogenation catalysts, hydrofinishing catalysts, reforming catalysts, hydration catalysts, hydrocracking catalysts, Fischer-Tropsch catalysts, dehydrogenation catalysts, and polymerization catalysts. In some cases, the catalyst comprises at least one component selected from the group consisting of phosphoric acid, sulfonic acid, sulfuric acid, zeolites, solid acid catalysts, and liquid acid catalysts.

In some embodiments, utilizing vacuum to extract unreacted light gases from the liquid carrier reduces coking when the liquid carrier is recycled or further processed. In some embodiments, the method comprises utilizing a high shear rate greater than 20,000 s$^{-1}$.

Herein also disclosed is a system for producing value-added product from light gases, the system comprising: at least one high shear device comprising at least one rotor and at least one complementarily-shaped stator, configured to produce a dispersion supersaturated with the light gases and comprising bubbles in a liquid carrier; a pump configured for delivering a liquid stream comprising the liquid carrier to the high shear device; apparatus to produce or store light gases comprising one or more of C1-C6 compounds; a reactor having at least one gas outlet and at least one liquid outlet, configured to receive the dispersion from the high shear device and to allow the value-added product to form; and a vacuum pump configured to extract gas molecules from a stream exiting the reactor liquid outlet.

In some embodiments, the at least one rotor is rotatable at a tip speed of at least 22.9 m/s (4,500 ft/min), wherein the tip speed is defined as $\pi Dn$, where D is the diameter of the rotor and n is the frequency of revolution. In some embodiments, the at least one rotor is separated from the at least one stator by a shear gap in the range of from about 0.02 mm to about 5 mm, wherein the shear gap is the minimum distance between the at least one rotor and the at least one stator. In some embodiments, the at least one rotor provides a shear rate of at least 20,000 s$^{-1}$ during operation, wherein the shear rate is defined as the tip speed divided by the shear gap, and wherein the tip speed is defined as πDn, where D is the diameter of the rotor and n is the frequency of revolution. In some embodiments, the high shear device comprises the above combined features related to tip speed, shear gap width, and shear rate.

In some embodiments, the high shear device comprises at least two generators, wherein each generator comprises a rotor and a complementarily-shaped stator.

In some embodiments, the system comprises more than one high shear device. In some embodiments, the more than one high shear devices are configured in parallel, or in series, or both.

In some embodiments, the reactor is an FCC reactor. In some embodiments, the reactor is a GTL reactor.

In some embodiments, the apparatus to produce or store light gases comprises a cracker configured for breaking organic molecules into simpler molecules. In some embodiments, the apparatus to produce or store light gases comprises an oil refinery or some components thereof, or a fossil fuel burning facility or some components thereof.

In some embodiments, the system is configured to recycle the liquid carrier, or unreacted gas components, or both. In some embodiments, the system comprises a catalyst and is optionally configured to reuse the catalyst.

Certain embodiments of the above-described methods or systems potentially provide overall cost reduction by providing for reduced catalyst usage, permitting increased fluid throughput, permitting operation at lower temperature and/or pressure, and/or reducing capital and/or operating costs. These and other embodiments and potential advantages will be apparent in the following detailed description and drawings.

BRIEF DESCRIPTION OF THE DRAWINGS

For a more detailed description of the preferred embodiment of the present invention, reference will now be made to the accompanying drawings, wherein.

NOTATION AND NOMENCLATURE

As used herein, the term 'dispersion' refers to a liquefied mixture that contains at least two distinguishable substances (or 'phases') that will not readily mix and dissolve together. As used herein, a 'dispersion' comprises a 'continuous' phase (or 'matrix'), which holds therein discontinuous droplets, bubbles, and/or particles of the other phase or substance. The term dispersion may thus refer to foams comprising gas bubbles suspended in a liquid continuous phase, emulsions in which droplets of a first liquid are dispersed throughout a continuous phase comprising a second liquid with which the first liquid is immiscible, and continuous liquid phases throughout which solid particles are distributed. As used herein, the term "dispersion" encompasses continuous liquid phases throughout which gas bubbles are distributed, continuous liquid phases throughout which solid particles (e.g., solid catalyst) are distributed, continuous phases of a first liquid throughout which droplets of a second liquid that is substantially insoluble in the continuous phase are distributed, and liquid phases throughout which any one or a combination of solid particles, immiscible liquid droplets, and gas bubbles are distributed. Hence, a dispersion can exist as a homogeneous mixture in some cases (e.g., liquid/liquid phase), or as a heterogeneous mixture (e.g., gas/liquid, solid/liquid, or gas/solid/liquid), depending on the nature of the materials selected for combination.

Generally, the term "light gases" comprise at least one of C1 to C6 compounds and may contain hydrogen. In embodiments, the light gases comprise at least one of C1 to C4 compounds and may contain hydrogen. For example, the light gases comprise one or more chosen from methane, ethane, propane, butane, ethylene, propylene, butylene, carbon dioxide, carbon monoxide, and hydrogen.

The term 'gas oil' refers to middle-distillate petroleum fraction with a boiling range of about 350° F. to 750° F., and may include diesel fuel, kerosene, heating oil, and light fuel oil.

The use of "high shear" generally refers to a shear rate greater than 20,000 s$^{-1}$.

The term 'gasoline' refers to a blend of naphthas and other refinery products with sufficiently high octane and other desirable characteristics to be suitable for use as fuel in internal combustion engines.

Use of the phrase, 'all or a portion of' is used herein to mean 'all or a percentage of the whole' or 'all or some components of.'

DETAILED DESCRIPTION

Overview

The method and system of this disclosure are provided to incorporate light gases (e.g., methane) in a liquid carrier (organic or inorganic) with the use of high shear to dissociate the light gases and form C2+ compounds and excess hydrogen (as material balance would dictate). The use of one or more high shear units causes super saturation of the light gases in the liquid carrier and also creates free radicals. The mixture obtained via high shear then enters a reactor or vessel where dehydrogenation of the light gases (e.g., methane) would continue with or without a catalyst present and form C2+ compounds and hydrogen. The C2+ compounds are extracted from the reactor product for further processing and the unreacted light gases are also extracted to be recycled and further converted. It has been surprisingly discovered that the unreacted light gases need to be extracted not only as light components from the reactor but also vacuumed from the liquid product because a portion of the light gases is embedded in the liquid phase due to super saturation. Vacuuming the light gases out of the liquid product reduces or eliminates carbon generation (or coking) during further processing of the C2+ compounds.

A system and process for producing value-added products from light gases comprises one or more external high shear devices to provide rapid contact and mixing of reactants in a controlled environment in the shear device as a reactor or mixer. A system that comprises an external high shear device (HSD) or mixer as described herein may decrease mass transfer limitations and thereby allow the reaction, which may be catalytic, to more closely approach kinetic and/or thermodynamic limitations. The HSD also promotes free radical reactions Enhanced mixing may also homogenize the temperature within the reaction zone(s). Enhancing contact via the use of high shear may permit increased throughput and/or the use of a decreased amount of catalyst relative to conventional processes. The use of a HSD may also provide for eliminating the use of catalyst entirely in some instances.

Such a system also comprises one or more vacuum pumps and pressure pumps such that the products and light gases are extracted as needed and the fluid flow is properly maintained in the system. The details or such system and process are described herein below, in some cases, using FCC and GTL processes as examples.

High Shear System for Producing Value-Added Products from Light Gases.

A high shear system 100 for producing value-added products from light gases will be described with reference to FIG. 1, which is a simplified process flow diagram of an embodiment of a high shear system 100. The main components of a representative system include external high shear device (HSD) 40, reactor 10, vacuum pumps 6 and 7; and pump 5. Each of these components is further described in more detail below. Line 21 is connected to pump 5 for introducing reactants or a liquid carrier into pump 5 and exists via line 12. Line 13 connects line 12 to HSD 40, and line 18 carries product dispersion out of HSD 40. Line 19 introduces the dispersion created in HSD 40 to reactor 10. Additional components or process steps can be incorporated between flow line 18 and 19, 12 and 13, or ahead of pump 5 or HSD 40, if desired, as will become apparent upon reading the description of the high shear process hereinbelow. Light gases are introduced via line 22 to mix with the liquid carrier in HSD 40.

Reactor 10 has a gas line 14 that is connected to a vacuum pump 6. Gas components are extracted via line 15 and preferably recycled. In some cases, vacuum pump is used to adjust the pressure in reactor 10 to ensure optimal reaction pressure. Line 16 extracts a stream comprising C2+ compounds or value-added products, which passes through vacuum pump 7. Vacuum pump 7 separates the light gases embedded in the liquid product/carrier, which goes through line 11. The C2+ compounds proceed through line 17 and are further processed. In some cases, line 20 carries the liquid carrier, which is recycled, for example, by connecting to line 21, or line 13, or line 19.

In some cases, product may be removed from system 100 via flow line 19. Flow line 19 is any line into which product dispersion (comprising at least liquids and gases) and any unreacted reactants from HSD 40 flow. System 100 may further comprise an apparatus for production of light gases, as described further hereinbelow. Line 22 is configured to introduce light gases into HSD 40. Line 22 may introduce dispersible light gas into HSD directly or may introduce light gases into line 13. In embodiments, line 22 is connected with light gases production apparatus. Alternatively, dispersible light gas inlet line 22 is connected to a light gas storage unit.

Conditions of temperature, pressure, space velocity, and reactant composition may be adjusted to produce a desired product profile. The use of HSD may allow for better interaction and more uniform mixing of the reactants and may therefore permit an increase in possible throughput and/or product yield. In some embodiments, the operating conditions of system 100 comprise a temperature of at or near ambient temperature and global pressure of at or near atmospheric pressure. Because the HSD 40 provides high pressure (e.g. 150,000 psi) at the tips of the rotors, the temperature of the reaction may be reduced relative to conventional reaction systems in the absence of high shear. In embodiments, the operating temperature is less than about 70% of the conventional operating temperature, or less than about 60% of the conventional operating temperature, or less than about 50% of the conventional operating temperature for the same reaction(s).

The residence time within HSD 40 is typically low. For example, the residence time can be in the millisecond range, can be about 10, 20, 30, 40, 50, 60, 70, 80, 90 or about 100 milliseconds, can be about 100, 200, 300, 400, 500, 600, 700, 800, or about 900 milliseconds, can be in the range of seconds, or can be any range thereamong.

Commonly known hydration reaction conditions may suitably be employed as the conditions to promote production of an alcohol by hydrating olefins in light gases by using catalysts. There is no particular restriction as to the reaction conditions. The hydration reaction of an olefin is an equilibrium reaction to the reverse reaction, that is, the dehydration reaction of an alcohol, and a low temperature and a high pressure are ordinarily advantageous for the formation of an alcohol. However, preferred conditions greatly differ according to the particular starting olefin. From the viewpoint of the rate of reaction, a higher temperature is preferred. Accordingly, it is difficult to simply define the reaction conditions. However, in embodiments, a reaction temperature may range from about 50° C. to about 350° C., preferably from about 100° C. to about 300° C. Furthermore, the reaction pressure may range from about 1 to 300 atmospheres, alternatively 1 to 250 atmospheres.

The bulk or global operating temperature of the reactants is desirably maintained below their flash points. In some embodiments, the operating conditions of system 100 comprise a temperature in the range of from about 50° C. to about 300° C. In specific embodiments, the reaction temperature in vessel 10, in particular, is in the range of from about 90° C. to about 220° C. In some embodiments, the reaction pressure in vessel 10 is in the range of from about 5 atm to about 50 atm.

The dispersion may be further processed prior to entering vessel 10, if desired. In vessel 10, reactions (e.g. olefin hydration) continue. The contents of the vessel are stirred continuously or semi-continuously, the temperature of the reactants is controlled (e.g., using a heat exchanger), and the fluid level inside vessel 10 is regulated using standard techniques. Reaction may occur either continuously, semi-continuously or batch wise, as desired for a particular application.

High Shear Device.

External high shear device (HSD) 40, also sometimes referred to as a high shear mixer, is configured for receiving an inlet stream, via line 13, comprising reactants. Alternatively, HSD 40 may be configured for receiving the reactants via separate inlet lines. Although only one HSD is shown in FIG. 1, it should be understood that some embodiments of the system can comprise two or more HSDs arranged either in series or parallel flow.

HSD 40 is a mechanical device that utilizes one or more generator(s) comprising a rotor/stator combination, each of which has a gap between the stator and rotor. The gap between the rotor and the stator in each generator set may be fixed or may be adjustable. HSD 40 is configured in such a way that it is capable of effectively contacting the reactants with the catalyst therein at rotational velocity. The HSD comprises an enclosure or housing so that the pressure and temperature of the fluid therein may be controlled.

High shear mixing devices are generally divided into three general classes, based upon their ability to mix fluids. Mixing is the process of reducing the size of particles or inhomogeneous species within the fluid. One metric for the degree or thoroughness of mixing is the energy density per unit volume that the mixing device generates to disrupt the fluid particles. The classes are distinguished based on delivered energy densities. Three classes of industrial mixers having sufficient energy density to consistently produce mixtures or emulsions with particle sizes in the range of submicron to 50 microns include homogenization valve systems, colloid mills and high speed mixers. In the first class of high energy devices, referred to as homogenization valve systems, fluid to be processed is pumped under very high pressure through a narrow-gap valve into a lower pressure environment. The pressure gradients across the valve and the resulting turbulence and cavitation act to break-up any particles in the fluid. These valve systems are most commonly used in milk homogenization and can yield average particle sizes in the submicron to about 1 micron range.

At the opposite end of the energy density spectrum is the third class of devices referred to as low energy devices. These systems usually have paddles or fluid rotors that turn at high speed in a reservoir of fluid to be processed, which in many of the more common applications is a food product. These low energy systems are customarily used when average particle sizes of greater than 20 microns are acceptable in the processed fluid.

Between the low energy devices and homogenization valve systems, in terms of the mixing energy density delivered to the fluid, are colloid mills and other high speed rotor-stator devices, which are classified as intermediate energy devices. A typical colloid mill configuration includes a conical or disk rotor that is separated from a complementary, liquid-cooled stator by a closely-controlled rotor-stator gap, which is commonly between 0.025 mm to 10 mm (0.001-0.40 inch). Rotors are usually driven by an electric motor through a direct drive or belt mechanism. As the rotor rotates at high rates, it pumps fluid between the outer surface of the rotor and the inner surface of the stator, and shear forces generated in the gap process the fluid. Many colloid mills with proper adjustment achieve average particle sizes of 0.1 to 25 microns in the processed fluid. These capabilities render colloid mills appropriate for a variety of applications including colloid and oil/water-based emulsion processing such as that required for cosmetics, mayonnaise, or silicone/silver amalgam formation, to roofing-tar mixing.

The HSD comprises at least one revolving element that creates the mechanical force applied to the reactants therein. The HSD comprises at least one stator and at least one rotor separated by a clearance. For example, the rotors can be conical or disk shaped and can be separated from a complementarily-shaped stator. In embodiments, both the rotor and stator comprise a plurality of circumferentially-spaced rings having complementarily-shaped tips. A ring may comprise a solitary surface or tip encircling the rotor or the stator. In embodiments, both the rotor and stator comprise more than 2 circumferentially-spaced rings, more than 3 rings, or more than 4 rings. For example, in embodiments, each of three generators comprises a rotor and stator each having 3 complementary rings, whereby the material processed passes through 9 shear gaps or stages upon traversing HSD 40. Alternatively, each of three generators may comprise four rings, whereby the processed material passes through 12 shear gaps or stages upon passing through HSD 40. In some embodiments, the stator(s) are adjustable to obtain the desired shear gap between the rotor and the stator of each generator (rotor/stator set). Each generator may be driven by any suitable drive system configured for providing the desired rotation.

In some embodiments, HSD 40 comprises a single stage dispersing chamber (i.e., a single rotor/stator combination; a single high shear generator). In some embodiments, HSD 40 is a multiple stage inline disperser and comprises a plurality of generators. In certain embodiments, HSD 40 comprises at least two generators. In other embodiments, HSD 40 comprises at least 3 generators. In some embodiments, HSD 40 is a multistage mixer whereby the shear rate (which varies proportionately with tip speed and inversely with rotor/stator gap width) varies with longitudinal position along the flow pathway, as further described hereinbelow.

According to this disclosure, at least one surface within HSD 40 may be made of, impregnated with, or coated with a catalyst suitable for catalyzing a desired reaction, as described in U.S. patent application Ser. No. 12/476,415, which is hereby incorporated herein by reference for all purposes not contrary to this disclosure. For example, in embodiments, all or a portion of at least one rotor, at least one stator, or at least one rotor/stator set (i.e., at least one generator) is made of, coated with, or impregnated with a suitable catalyst. In some applications, it may be desirable to utilize two or more different catalysts. In such instances, a generator may comprise a rotor made of, impregnated with, or coated with a first catalyst material, and the corresponding stator of the generator may be made of, coated with, or impregnated by a second catalyst material. Alternatively one or more rings of the rotor may be made from, coated with, or impregnated with a first catalyst, and one or more rings of the rotor may be made from, coated with, or impregnated by a second catalyst. Alternatively one or more rings of the stator may be made from, coated with, or impregnated with a first catalyst, and one or more rings of the stator may be made from, coated with, or impregnated by a second catalyst. All or a portion of a contact surface of a stator, rotor, or both can be made from or coated with catalytic material.

A contact surface of HSD 40 can be made from a porous sintered catalyst material, such as platinum. In embodiments, a contact surface is coated with a porous sintered catalytic material. In applications, a contact surface of HSD 40 is coated with or made from a sintered material and subsequently impregnated with a desired catalyst. The sintered material can be a ceramic or can be made from metal powder, such as, for example, stainless steel or pseudoboehmite. The pores of the sintered material may be in the micron or the submicron range. The pore size can be selected such that the desired flow and catalytic effect are obtained. Smaller pore size may permit improved contact between fluid comprising reactants and catalyst. By altering the pore size of the porous material (ceramic or sintered metal), the available surface area of the catalyst can be adjusted to a desired value. The sintered material may comprise, for example, from about 70% by volume to about 99% by volume of the sintered material or from about 80% by volume to about 90% by volume of the sintered material, with the balance of the volume occupied by the pores.

In embodiments, the rings defined by the tips of the rotor/stator contain no openings (i.e. teeth or grooves) such that substantially all of the reactants are forced through the pores of the sintered material, rather than being able to bypass the catalyst by passing through any openings or grooves which are generally present in conventional dispersers. In this manner, for example, a reactant will be forced through the sintered material, thus forcing contact with the catalyst.

In embodiments, the sintered material of which the contact surface is made comprises stainless steel or bronze. The sintered material (sintered metal or ceramic) may be passivated. A catalyst may then be applied thereto. The catalyst may be applied by any means known in the art. The contact surface may then be calcined to yield the metal oxide (e.g. stainless steel). The first metal oxide (e.g., the stainless steel oxide) may be coated with a second metal and calcined again. For example, stainless steel oxide may be coated with aluminum and calcined to produce aluminum oxide. Subsequent treatment may provide another material. For example, the aluminum oxide may be coated with silicon and calcined to provide silica. Several calcining/coating steps may be utilized to provide the desired contact surface and catalyst(s). In this manner, the sintered material which either makes up the contact surface or coats the contact surface may be impregnated with a variety of catalysts. Another coating technique, for example, is metal vapor deposition or chemical vapor deposition, such as typically used for coating silicon wafers with metal.

In embodiments, a sintered metal contact surface (e.g., of the rotor or the stator) is treated with a material. For example, tetra ethyl ortho silicate (TEOS). Following vacuum evaporation, TEOS may remain in surface pores. Calcination may be used to convert the TEOS to silica. This impregnation may be repeated for all desired metal catalysts. Upon formation, coating, or impregnation, the catalyst(s) may be activated according to manufacturer's protocol. For example, catalysts may be activated by contacting with an activation gas, such as hydrogen. The base material may be silicon or aluminum which, upon calcination, is converted to alumina or silica respectively. Suitable catalysts, including without limitation, rhenium, palladium, rhodium, etc. can subsequently be impregnated into the pores.

In some embodiments, the minimum clearance (shear gap width) between the stator and the rotor is in the range of from about 0.025 mm (0.001 inch) to about 3 mm (0.125 inch). In some embodiments, the minimum clearance (shear gap width) between the stator and the rotor is in the range of from about 1 μm (0.00004 inch) to about 3 mm (0.012 inch). In some embodiments, the minimum clearance (shear gap width) between the stator and the rotor is less than about 10 μm (0.0004 inch), less than about 50 μm (0.002 inch), less than about 100 μm (0.004 inch), less than about 200 μm (0.008 inch), less than about 400 μm (0.016 inch). In certain embodiments, the minimum clearance (shear gap width) between the stator and rotor is about 1.5 mm (0.06 inch). In certain embodiments, the minimum clearance (shear gap width) between the stator and rotor is about 0.2 mm (0.008 inch). In certain configurations, the minimum clearance (shear gap) between the rotor and stator is at least 1.7 mm (0.07 inch). The shear rate produced by the HSD may vary with longitudinal position along the flow pathway. In some embodiments, the rotor is set to rotate at a speed commensurate with the diameter of the rotor and the desired tip speed. In some embodiments, the HSD has a fixed clearance (shear gap width) between the stator and rotor. Alternatively, the HSD has adjustable clearance (shear gap width). The shear gap may be in the range of from about 5 micrometers (0.0002 inch) and about 4 mm (0.016 inch).

Tip speed is the circumferential distance traveled by the tip of the rotor per unit of time. Tip speed is thus a function of the rotor diameter and the rotational frequency. Tip speed (in meters per minute, for example) may be calculated by multiplying the circumferential distance transcribed by the rotor tip, $2\pi R$, where R is the radius of the rotor (meters, for example) times the frequency of revolution (for example revolutions per minute, rpm). The frequency of revolution may be greater than 250 rpm, greater than 500 rpm, greater than 1000 rpm, greater than 5000 rpm, greater than 7500 rpm, greater than 10,000 rpm, greater than 13,000 rpm, or greater than 15,000 rpm. The rotational frequency, flow rate, and temperature may be adjusted to get a desired product profile. If channeling should occur, and some reactants pass through unreacted, the rotational frequency may be increased to minimize undesirable channeling. Alternatively or additionally, unreacted reactants may be introduced into a second or subsequent HSD 40, or a portion of the unreacted reactants may be separated from the products and recycled to HSD 40.

HSD 40 may have a tip speed in excess of 22.9 m/s (4500 ft/min) and may exceed 40 m/s (7900 ft/min), 50 m/s (9800 ft/min), 100 m/s (19,600 ft/min), 150 m/s (29,500 ft/min), 200 m/s (39,300 ft/min), or even 225 m/s (44,300 ft/min) or greater in certain applications. For the purpose of this disclosure, the term 'high shear' refers to mechanical rotor stator devices (e.g., colloid mills or rotor-stator dispersers) that are capable of tip speeds in excess of 5.1 m/s. (1000 ft/min) and require an external mechanically driven power device to drive energy into the stream of products to be reacted. By contacting the reactants with the rotating members, which can be made from, coated with, or impregnated with stationary catalyst, significant energy is transferred to the reaction. Especially in instances where the reactants are gaseous, the energy consumption of the HSD 40 will be very low. The temperature may be adjusted to control the product profile and to extend catalyst life.

In some embodiments, HSD 40 is capable of delivering at least 300 L/h at a tip speed of at least 22.9 m/s (4500 ft/min). The power consumption may be about 1.5 kW. HSD 40 combines high tip speed with a very small shear gap to produce significant shear on the material being processed. The amount of shear will be dependent on the viscosity of the fluid in HSD 40. Accordingly, a local region of elevated pressure and temperature is created at the tip of the rotor during operation of HSD 40. In some cases the locally elevated pressure is about 1034.2 MPa (150,000 psi). In some cases the locally elevated temperature is about 500° C. In some cases, these local pressure and temperature elevations may persist for nano or pico seconds.

An approximation of energy input into the fluid (kW/L/min) can be estimated by measuring the motor energy (kW) and fluid output (L/min). As mentioned above, tip speed is the velocity (ft/min or m/s) associated with the end of the one or more revolving elements that is creating the mechanical force applied to the fluid. In embodiments, the energy expenditure of HSD 40 is greater than 1000 watts per cubic meter of fluid therein. In embodiments, the energy expenditure of HSD 40 is in the range of from about 3000 W/m$^3$ to about 7500 kW/m$^3$. In embodiments, the energy expenditure of HSD 40 is in the range of from about 3000 W/m$^3$ to about 7500 W/m$^3$. The actual energy input needed is a function of what reactions are occurring within the HSD, for example, endothermic and/or exothermic reaction(s), as well as the mechanical energy required for dispersing and mixing feedstock materials. In some applications, the presence of exothermic reaction(s) occurring within the HSD mitigates some or substantially all of the reaction energy needed from the motor input. When dispersing a gas in a liquid, the energy requirements are significantly less.

The shear rate is the tip speed divided by the shear gap width (minimal clearance between the rotor and stator). The shear rate generated in HSD 40 may be in the greater than 20,000 s$^{-1}$. In some embodiments the shear rate is at least 40,000 s$^{-1}$. In some embodiments the shear rate is at least 100,000 s$^{-1}$. In some embodiments the shear rate is at least 500,000 s$^{-1}$. In some embodiments the shear rate is at least 1,000,000 s$^{-1}$. In some embodiments the shear rate is at least 1,600,000 s$^{-1}$. In some embodiments the shear rate is at least 3,000,000 s$^{-1}$. In some embodiments the shear rate is at least 5,000,000 s$^{-1}$. In some embodiments the shear rate is at least 7,000,000 s$^{-1}$. In some embodiments the shear rate is at least 9,000,000 s$^{-1}$. In embodiments where the rotor has a larger diameter, the shear rate may exceed about 9,000,000 s$^{-1}$. In embodiments, the shear rate generated by HSD 40 is in the range of from 20,000 s$^{-1}$ to 10,000,000 s$^{-1}$. For example, in one application the rotor tip speed is about 40 m/s (7900 ft/min) and the shear gap width is 0.0254 mm (0.001 inch), producing a shear rate of 1,600,000 s$^{-1}$. In another application the rotor tip speed is about 22.9 m/s (4500 ft/min) and the shear gap width is 0.0254 mm (0.001 inch), producing a shear rate of about 901,600 s$^{-1}$.

In some embodiments, HSD 40 comprises a colloid mill. Suitable colloidal mills are manufactured by IKA® Works, Inc. Wilmington, N.C. and APV North America, Inc. Wilmington, Mass., for example. In some instances, HSD 40 comprises the DISPAX REACTOR® of IKA® Works, Inc.

In some embodiments, each stage of the external HSD has interchangeable mixing tools, offering flexibility. For example, the DR 2000/4 DISPAX REACTOR® of IKA® Works, Inc. Wilmington, N.C. and APV North America, Inc. Wilmington, Mass., comprises a three stage dispersing module. This module may comprise up to three rotor/stator combinations (generators), with choice of fine, medium, coarse, and super-fine for each stage. This allows for variance of shear rate along the direction of flow. In some embodiments, each of the stages is operated with super-fine generator. In some embodiments, at least one of the generator sets has a rotor/stator minimum clearance (shear gap width) of greater than about 5 mm (0.2 inch). In some embodiments, at least one of the generator sets has a rotor/stator minimum clearance (shear gap width) of about 0.2 mm (0.008 inch). In alternative embodiments, at least one of the generator sets has a minimum rotor/stator clearance of greater than about 1.7 mm (0.07 inch).

Figure 2:
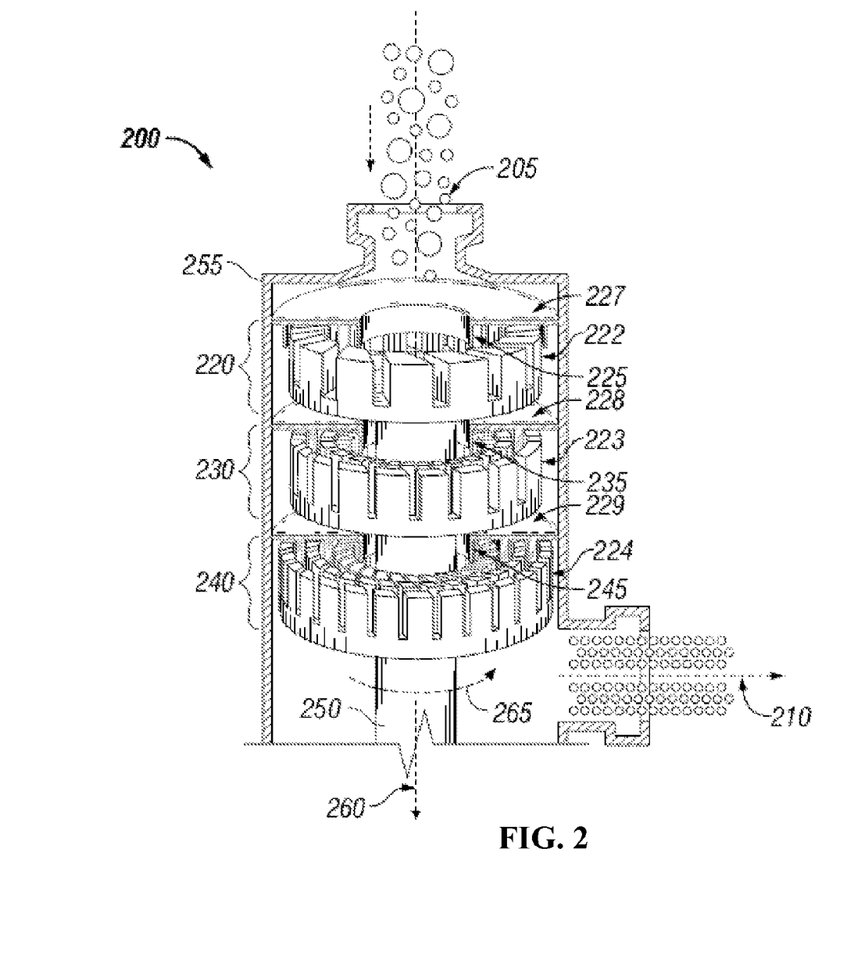
FIG. 2 is a longitudinal cross-section view of a high shear mixing device suitable for use in embodiments of the system of FIG. 1.

In embodiments, a scaled-up version of the DISPAX REACTOR® is utilized. For example, in embodiments HSD 40 comprises a SUPER DISPAX REACTOR® DRS 2000. The HSD unit may be a DR 2000/50 unit, having a flow capacity of 125,000 liters per hour, or a DRS 2000/50 having a flow capacity of 40,000 liters/hour. Because residence time is increased in the DRS unit, the fluid therein is subjected to more shear. Referring now to FIG. 2, there is presented a longitudinal cross-section of a suitable HSD 200. HSD 200 of FIG. 2 is a dispersing device comprising three stages or rotor-stator combinations, 220, 230, and 240. The rotor-stator combinations may be known as generators 220, 230, 240 or stages without limitation. Three rotor/stator sets or generators 220, 230, and 240 are aligned in series along drive shaft 250.

First generator 220 comprises rotor 222 and stator 227. Second generator 230 comprises rotor 223, and stator 228. Third generator 240 comprises rotor 224 and stator 229. For each generator the rotor is rotatably driven by input 250 and rotates about axis 260 as indicated by arrow 265. The direction of rotation may be opposite that shown by arrow 265 (e.g., clockwise or counterclockwise about axis of rotation 260). Stators 227, 228, and 229 may be fixably coupled to the wall 255 of HSD 200. As mentioned hereinabove, each rotor and stator may comprise rings of complementarily-shaped tips, leading to several shear gaps within each generator.

As discussed above, a contact surface of the HSD 40 may be made from, coated with, or impregnated by a suitable catalyst which catalyzes the desired reaction. In embodiments, a contact surface of one ring of each rotor or stator is made from, coated with, or impregnated with a different catalyst than the contact surface of another ring of the rotor or stator. Alternatively or additionally, a contact surface of one ring of the stator may be made from coated with or impregnated by a different catalyst than the complementary ring on the rotor. The contact surface may be at least a portion of the rotor, at least a portion of the stator, or both. The contact surface may comprise, for example, at least a portion of the outer surface of a rotor, at least a portion of the inner surface of a stator, or at least a portion of both.

As mentioned hereinabove, each generator has a shear gap width which is the minimum distance between the rotor and the stator. In the embodiment of FIG. 2, first generator 220 comprises a first shear gap 225; second generator 230 comprises a second shear gap 235; and third generator 240 comprises a third shear gap 245. In embodiments, shear gaps 225, 235, 245 have widths in the range of from about 0.025 mm to about 10 mm. Alternatively, the process comprises utilization of an HSD 200 wherein the gaps 225, 235, 245 have a width in the range of from about 0.5 mm to about 2.5 mm. In certain instances the shear gap width is maintained at about 1.5 mm. Alternatively, the width of shear gaps 225, 235, 245 are different for generators 220, 230, 240. In certain instances, the width of shear gap 225 of first generator 220 is greater than the width of shear gap 235 of second generator 230, which is in turn greater than the width of shear gap 245 of third generator 240. As mentioned above, the generators of each stage may be interchangeable, offering flexibility. HSD 200 may be configured so that the shear rate remains the same or increases or decreases stepwise longitudinally along the direction of the flow 260.

Generators 220, 230, and 240 may comprise a coarse, medium, fine, and super-fine characterization, having different numbers of complementary rings or stages on the rotors and complementary stators. Although generally less desirable, rotors 222, 223, and 224 and stators 227, 228, and 229 may be toothed designs. Each generator may comprise two or more sets of complementary rotor-stator rings. In embodiments, rotors 222, 223, and 224 comprise more than 3 sets of complementary rotor/stator rings. In embodiments, the rotor and the stator comprise no teeth, thus forcing the reactants to flow through the pores of a sintered material.

HSD 40 may be a large or small scale device. In embodiments, HSD 40 is used to process from less than 10 tons per hour to 50 tons per hour. In embodiments, HSD 40 processes 10 tons/h, 20 tons/h, 30 ton/hr, 40 tons/h, 50 tons/h, or more than 50 tons/h. Large scale units may produce 1000 gal/h (24 barrels/h). The inner diameter of the rotor may be any size suitable for a desired application. In embodiments, the inner diameter of the rotor is from about 12 cm (4 inch) to about 40 cm (15 inch). In embodiments, the diameter of the rotor is about 6 cm (2.4 inch). In embodiments, the outer diameter of the stator is about 15 cm (5.9 inch). In embodiments, the diameter of the stator is about 6.4 cm (2.5 inch). In some embodiments the rotors are 60 cm (2.4 inch) and the stators are 6.4 cm (2.5 inch) in diameter, providing a clearance of about 4 mm. In certain embodiments, each of three stages is operated with a super-fine generator comprising a number of sets of complementary rotor/stator rings.

HSD 200 is configured for receiving at inlet 205 a fluid mixture from line 13. The mixture comprises reactants. The reactants comprise RRG. In embodiments, at least one reactant is gaseous and at least one reactant is liquid. Feed stream entering inlet 205 is pumped serially through generators 220, 230, and then 240, such that product is formed. Product exits HSD 200 via outlet 210 (and line 19 of FIG. 1). The rotors 222, 223, 224 of each generator rotate at high speed relative to the fixed stators 227, 228, 229, providing a high shear rate. The rotation of the rotors pumps fluid, such as the feed stream entering inlet 205, outwardly through the shear gaps (and, if present, through the spaces between the rotor teeth and the spaces between the stator teeth), creating a localized high shear condition. High shear forces exerted on fluid in shear gaps 225, 235, and 245 (and, when present, in the gaps between the rotor teeth and the stator teeth) through which fluid flows process the fluid and create product. The product may comprise a dispersion of unreacted or product gas in a continuous phase of liquid (e.g., liquid product and carrier/catalyst). Product exits HSD 200 via high shear outlet 210 (and line 19 of FIG. 1).

As mentioned above, in certain instances, HSD 200 comprises a DISPAX REACTOR® of IKA® Works, Inc. Wilmington, N.C. and APV North America, Inc. Wilmington, Mass. Several models are available having various inlet/outlet connections, horsepower, tip speeds, output rpm, and flow rate. Selection of the HSD will depend on throughput selection and desired particle, droplet or bubble size in dispersion in line 10 (FIG. 1) exiting outlet 210 of HSD 200. IKA® model DR 2000/4, for example, comprises a belt drive, 4M generator, PTFE sealing ring, inlet flange 25.4 mm (1 inch) sanitary clamp, outlet flange 19 mm (¾ inch) sanitary clamp, 2HP power, output speed of 7900 rpm, flow capacity (water) approximately 300-700 L/h (depending on generator), a tip speed of from 9.4-41 m/s (1850 ft/min to 8070 ft/min). Scale up may be performed by using a plurality of HSDs, or by utilizing larger HSDs. Scale-up using larger models is readily performed, and results from larger HSD 40 units may provide improved efficiency in some instances relative to the efficiency of lab-scale devices. The large scale unit may be a DISPAX® 2000/unit. For example, the DRS 2000/5 unit has an inlet size of 51 mm (2 inches) and an outlet of 38 mm (1.5 inches).

In embodiments wherein strong acid is utilized as carrier, HSD 40 and other portions of system 100 may be made from refractory/corrosion resistant materials. For example, Inconel® alloys, tungsten or Hastelloy® materials may be used.

Vessel/Reactor.

Vessel or reactor 10 is any type of vessel in which a multiphase reaction can be propagated to carry out the above-described conversion reaction(s). For instance, a continuous or semi-continuous stirred tank reactor, or one or more batch reactors may be employed in series or in parallel. In some applications vessel 10 may be a tower reactor, and in others a tubular reactor or multi-tubular reactor. A catalyst inlet line may be connected to vessel 10 for receiving a catalyst solution or slurry during operation of the system. In embodiments where a significant reaction occurs in HSD 40, vessel 10 may comprise one or more fractionators suitable for separating components selected from unreacted and light gas, liquid carrier, catalyst, and value-added product.

Vessel 10 may comprise outlet lines for unreacted or light product gas 14, product 17 and carrier fluid 20. In embodiments, system 100 comprises distinct apparatus configured to separate unreacted and/or light gas from value-added product, to separate carrier fluid from value-added product, to separate catalyst from value-added product or to separate some combination thereof.

Vessel 10 may include one or more of the following components: stirring system, heating and/or cooling capabilities, pressure measurement instrumentation, temperature measurement instrumentation, one or more injection points, and level regulator, as are known in the art of reaction vessel design. For example, a stirring system may include a motor driven mixer. A heating and/or cooling apparatus may comprise, for example, a heat exchanger. Alternatively, as much of the reaction may occur within HSD 40 in some embodiments, vessel 10 may serve primarily as a storage vessel in some cases. Although generally less desired, in some applications vessel 10 may be omitted, particularly if multiple high shears/reactors are employed in series, as further described below.

Light Gases.

Dispersible light gases or light gases may be any suitable light gases comprising at least one of C1-C6 compounds. The light gases typically comprise C1 to C4 fractions and hydrogen. For example, light gases may comprise any combination of methane, ethane, propane, butane, ethylene, propylene, butylene, carbon monoxide, and carbon dioxide. light gases may also comprise hydrogen and/or sulfur compounds, such as hydrogen sulfide. In some cases, light gases comprise negative value gas from a refinery. As used herein, negative value gas is a gas whose disposal has a cost and/or is not profitable, such as a gas normally flared or treated in an expensive manner, perhaps prior to flaring. In embodiments, gases used as light gases are those gases typically conventionally used as boiler fuel or flared. In embodiments, light gases comprise gas conventionally introduced into a gas plant of a refinery. In embodiments, light gases comprises pyrolysis gas, coker offgas, FCC offgas, light FCC offgas, associated gas, or a combination thereof.

Heat Transfer Devices.

Internal or external heat transfer devices for heating the fluid to be treated are also contemplated in variations of the system. For example, the reactants may be preheated via any method known to one skilled in the art. Some suitable locations for one or more such heat transfer devices are between pump 5 and HSD 40, between HSD 40 and flow line 19, and between flow line 19 and pump 5 when fluid in flow line 19 is recycled to HSD 40. HSD 40 may comprise an inner shaft which may be cooled, for example water-cooled, to partially or completely control the temperature within HSD 40. Some non-limiting examples of such heat transfer devices are shell, tube, plate, and coil heat exchangers, as are known in the art.

Pumps.

Pump 5 is configured for either continuous or semi-continuous operation, and may be any suitable pumping device that is capable of providing controlled flow through HSD 40 and system 100. In applications pump 5 provides greater than 202.65 kPa (2 atm) pressure or greater than 303.97 kPa (3 atm) pressure. Pump 5 may be a Roper Type 1 gear pump, Roper Pump Company (Commerce Ga.) Dayton Pressure Booster Pump Model 2P372E, Dayton Electric Co (Niles, Ill.) is one suitable pump. Preferably, all contact parts of the pump comprise stainless steel, for example, 316 stainless steel. In some embodiments of the system, pump 5 is capable of pressures greater than about 2026.5 kPa (20 atm). In addition to pump 5, one or more additional, high pressure pumps may be included in the system illustrated in FIG. 1. For example, a booster pump, which may be similar to pump 5, may be included between HSD 40 and flow line 19 for boosting the pressure into flow line 19.

Enhanced Process for Producing Value-Added Products from Light Gases.

Figure 3:
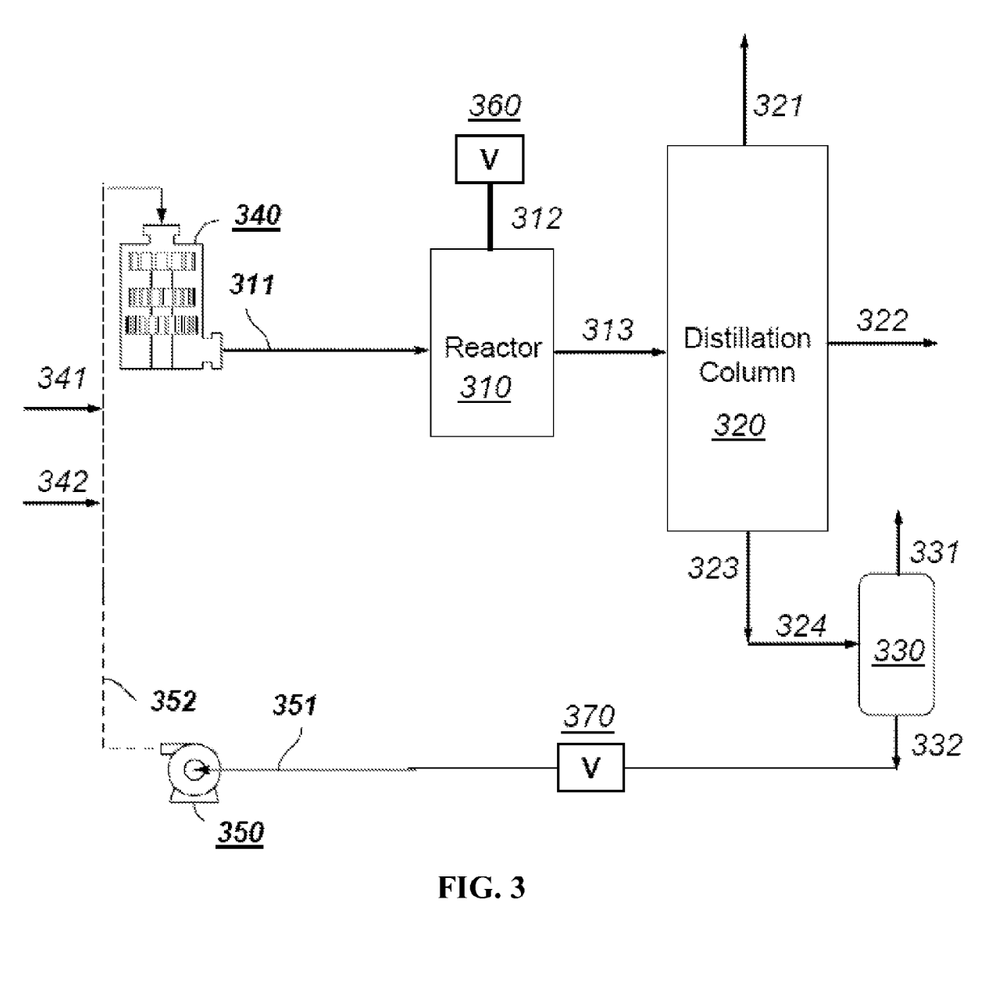
FIG. 3 is a simplified flow diagram of an enhanced process according to an embodiment of this disclosure.

A process for producing value-added products from light gases will be described with respect to FIG. 3, which is a simplified flow diagram of an enhanced process according to an embodiment of this disclosure. In some cases, the process as shown in FIG. 3 illustrates an enhanced FCC process.

The FCC feedstock may comprise a fraction of the crude oil that has an initial boiling point of 315° C. or higher at atmospheric pressure and an average molecular weight ranging from about 200 to 600 or higher. The FCC process vaporizes and breaks the long-chain molecules of the high-boiling hydrocarbon liquids into much shorter molecules by contacting the feedstock, at high temperature and moderate pressure, with a fluidized powdered catalyst. Any suitable FCC catalyst may be used as known to one skilled in the art.

A feedstock is subjected to catalytic cracking in reactor 310, which may comprise cracking the oil feedstock (i.e., the FCC feedstock) in the presence of a finely divided catalyst, by any means known in the art. The FCC catalyst may be maintained in an aerated or fluidized state by the oil vapors. The fluid catalytic cracker may contain a catalyst section and a fractionating section that operate together as an integrated processing unit. The catalyst section can contain the reactor and regenerator (not shown in FIG. 3), which, with the standpipe and riser, can form the catalyst circulation unit. The fluid catalyst can be continuously circulated between the FCC reactor and the regenerator using air, oil vapors, and/or steam as the conveying media. Spent FCC catalyst can be regenerated to eliminate coke that collects on the catalyst during the FCC process. Spent catalyst flows through the catalyst stripper to the regenerator, where most of the coke deposits burn off at the bottom where preheated air and spent catalyst are mixed. Fresh catalyst is added and worn-out catalyst removed to optimize the cracking process.

In embodiments, FCC is carried out by mixing a pre-heated hydrocarbon charge (i.e., the FCC feedstock) with hot, regenerated catalyst as it enters the riser leading to the FCC reactor. The charge is combined with a recycle stream within the riser, vaporized, and raised to reactor temperature (e.g., 900° to 1,000° F.) by the hot catalyst. As the mixture travels up the riser, the charge is cracked at 10 to 30 psi. In embodiments utilizing modern FCC units, all cracking can occur in the riser. The FCC 'reactor' may thus merely serve as a holding vessel for the cyclones. Cracking continues until the oil vapors are separated from the catalyst in the reactor cyclones.

In an embodiment, the FCC reactor 310 is connected to a vacuum pump 360 via line 312 such that the reactor is operated at optimum pressure in order to maintain desired flow rate through the system. In an embodiment, the FCC reactor 310 is connected to HSD 340 via line 311 to receive the processed stream from HSD 340.

The reactor product is introduced to a distillation column 320 via line 313, where a gas product is extracted via 321, a liquid product (e.g., fuel oil) is extracted via line 322, and the slurry product is extracted via line 323. In an embodiment, the gas product is sent to a condenser and may be partially refluxed. A cracked naphtha product may be taken from the condensed gas product. Unreacted light gases from the gas product are collected and recycled. In some cases, the slurry product is sent to a slurry settler 330 via line 324, where fuel oil is taken from the top of the slurry settler via line 331 and slurry oil is sent to a vacuum pump 370 via line 332. Vacuum pump 370 extracts unreacted light gases from the slurry, which are embedded in the liquid phase due to super saturation. The unreacted light gases are collected and recycled (not shown) and the slurry continues to pump 350 via line 351. Vacuuming the light gases before recycling the slurry/liquid product reduces or eliminates carbon generation (or coking).

The slurry/liquid is recycled via pump 350 and line 352 to HSD 340. Additional light gases may be added via line 341. Additional feedstock and optionally fresh catalyst may be added via line 342. (Additional feedstock and fresh catalyst may also be added elsewhere other than 342 as known to one skilled in the art.) Light gases, feedstock, and catalyst are intimately mixed in HSD 340 to produce a dispersion where the liquid phase is super saturated with the light gases. The dispersion is then introduced to reactor 310 for catalytic cracking.

Intimately mixing may comprise subjecting a mixture of the light gases and carrier and/or catalyst to a shear rate of at least 20,000 s$^{-1}$ or greater. Intimately mixing may comprise mixing to form a dispersion comprising bubbles of light gases dispersed in the carrier (which may contain catalyst), wherein the bubbles have an average particle diameter of about 5, 4, 3, 2, 1, or less than 1 micron. In embodiments, the bubbles have an average particle diameter in the nanometer range, the micron range, or the submicron range. The HSD may be a rotor-stator device as described hereinabove.

Figure 4:
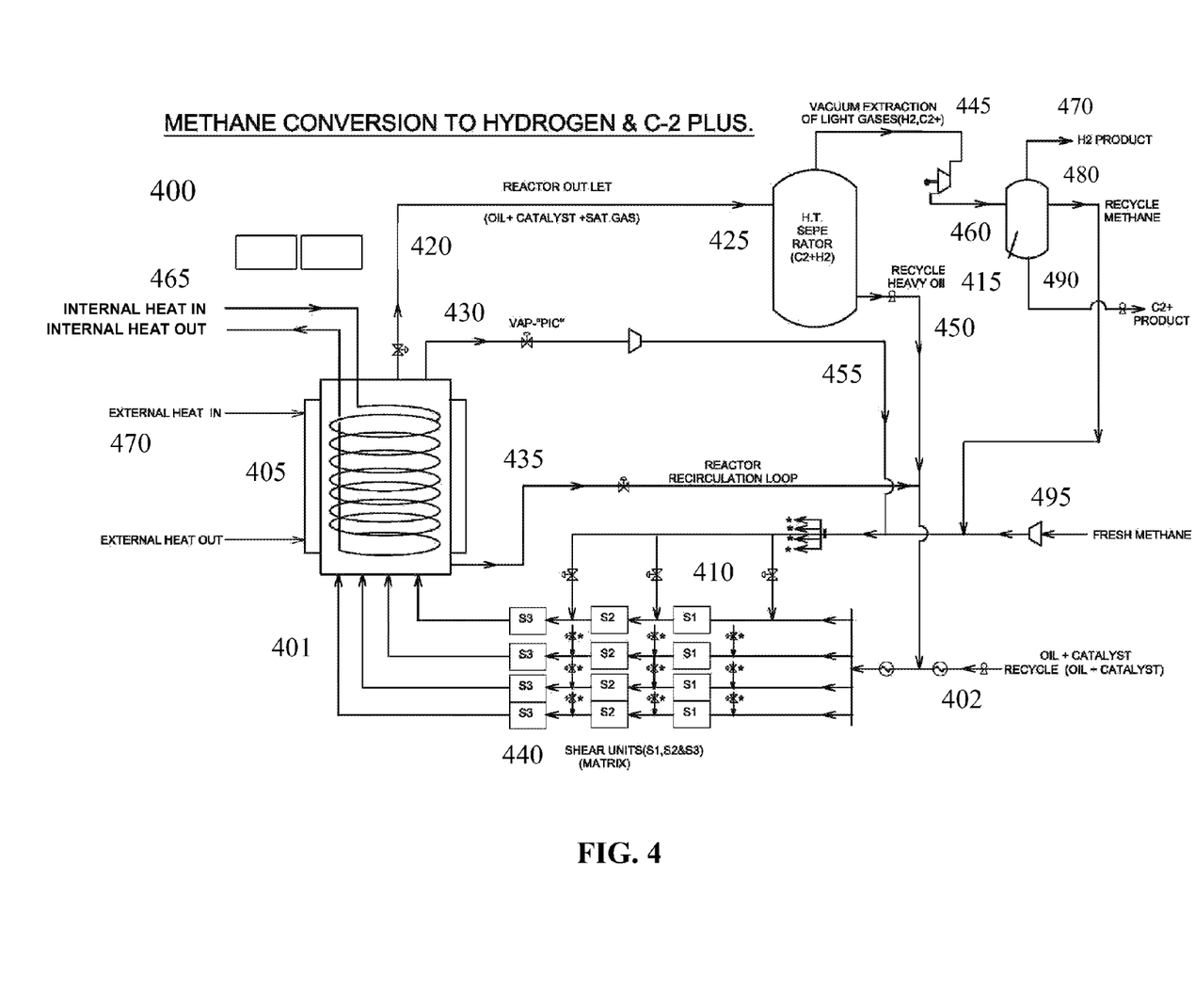
FIG. 4 is a simplified flow diagram of an enhanced process according to another embodiment of this disclosure.

A process for producing value-added products from light gases will be described with respect to FIG. 4, which is a simplified flow diagram of an enhanced process according to another embodiment of this disclosure. In some cases, the process as shown in FIG. 4 illustrates an enhanced GTL process, for example, of converting methane to hydrogen and C2+ compounds.

System 400 is now described in more detail. Hydrocarbon feedstock that is temperature controlled and optionally catalyst 402 is fed to one or more high shear units 440. Shear units 440 may be in series or in parallel or combinations thereof. Each shear unit 440 has individual feed lines 410 for introducing methane to the shear.

The hydrocarbon feedstock 402 is utilized mainly as a carrier for methane 495 that is injected via lines 410 simultaneously into the shear unit(s) 440.

The combined methane and hydrocarbon and optionally catalyst 401 then enter a vessel 405 that provides heat to the system 400. The reactor/vessel 405 has heating introduced with external 470 or internal 465 means or both. In some cases, the reactor 405 has a recirculation loop comprising line 435 to recycle the catalyst. After reaction, the contents of reactor 405 exit as either a gas 430 that is then reintroduced to the shear units via line 455; or they exit as a mixed fluid 420 and enter a high temperature separator 425, where light gases (such as H2 and C2+ compounds are vacuum extracted via line 445) and the heavy portion liquid/slurry may be recycled via line 450. Some of the extracted light gases (e.g., methane) is recycled via separator/vessel 415 and line 480. Separator 415 also produces hydrogen product via line 470 and C2+ products via line 490.

The gas stream 430 from the heating vessel 405 is used to control pressure and feed into the shear unit(s). The amount of recycled gas 430 and recycled gas/liquid and optionally catalyst 435 that is recycled from the heating vessel 405 is dependent on the conversion rates through the shear unit(s). A stream of hydrocarbon liquid, saturated gas, hydrogen, C2+ and optionally catalyst 420 is extracted from the heating vessel 405 and introduced to a vessel 425, such as a flash drum that separates the gaseous material 445 from the liquid hydrocarbon and optionally catalyst 450. It is important that residual dissolved gases 445 are removed from the hydrocarbon recycle stream 450 prior to reintroducing to the shear units 440. The flash drum 425 is operated under vacuum in order to extract light gaseous materials such as hydrogen, methane and C2+ compounds. The mixed gases 460 can then be further separated through membrane or other means 415 into hydrogen 470, C2+ products 490 and methane 480. The methane in line 480 may be recycled to along with fresh methane 495.

Catalyst used may be any that promote dehydrogenation of methane and/or formation of C2+ compounds or combinations thereof. Catalyst should be of suitable size and shape to minimize abrasion on close tolerance sections of the high shear units(s). Alkane dehydrogenation catalyst known to those experienced in the art include alumina, lithium oxide, alkaline earth metal oxide, chromium oxide, and sodium oxide as well as iron (III) oxide, promoted by several percent potassium oxide or potassium carbonate and Pincer-Ligated Iridium Catalysts. In embodiments, the catalysts may need to be regenerated in a process known to those experienced in the art but not shown in the system 400.

In embodiments a catalyst to promote the dehydrogenation of methane and formation of hydrogen and C2+ compounds may be an inorganic materials introduced into the shear device through the hydrocarbon stream. The inorganic material provides additional shear surface and increased shear temperatures and pressures as the inorganic material passes through the shear device due to the restricted space between the rotor and stator of the high shear unit. The increased temperatures and pressures have been shown to produce free radicals and non ideal conditions.

In embodiments, techniques known to those experienced in the art such as introducing inert compounds, such as steam or nitrogen, may be added to the feed to enhance the desired equilibrium.

In embodiments, subjecting light gas to high shear comprises intimately mixing light gas in the presence of a FT catalyst, whereby FT product is produced. In this manner, gas-to-liquids production of FT liquid hydrocarbons may be effected. Any suitable FT catalyst may be utilized. In embodiments, a portion of the HSD may be made from or coated with FT catalyst, slurry of FT catalyst may be circulated, or vessel may comprise a fixed or slurry bed of FT catalyst. Liquid hydrocarbons may be extracted from the reactor.

Multiple Pass Operation.

Figure 1:
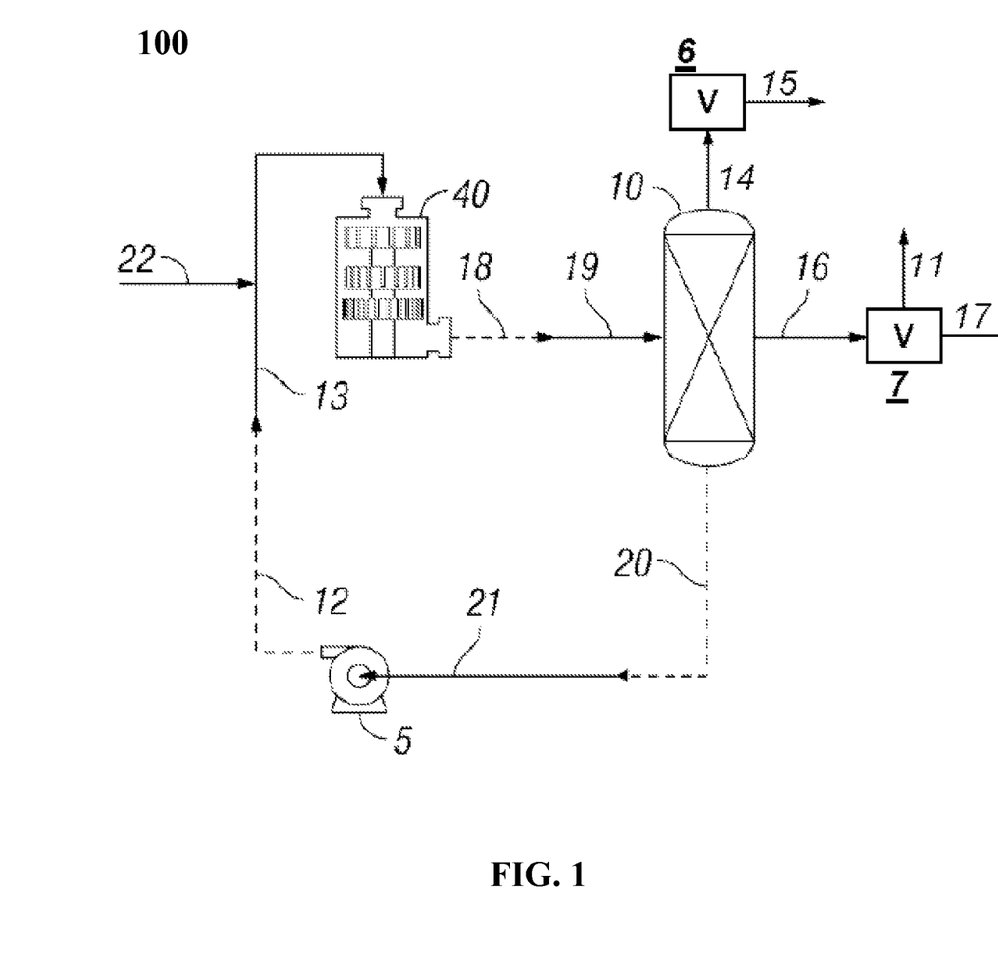
FIG. 1 is a simplified process flow diagram illustrating a system and process utilizing high shear and vacuum, according to an embodiment of the present disclosure.

In the embodiment shown in FIG. 1, the system is configured for single pass operation, wherein the product produced in HSD 40 continues along flow line 17. The output of HSD 40 may be run through a subsequent HSD. In some embodiments, it may be desirable to pass the contents of flow line 19, or a fraction thereof, through HSD 40 during a second pass. In this case, at least a portion of the contents of flow line 19 may be recycled from flow line 19 and pumped by pump 5 into line 13 and thence into HSD 40. Additional reactants may be injected via line 22 into line 13, or may be added directly into the HSD. In other embodiments, product is further treated prior to recycle of a portion thereof to HSD 40.

Multiple HSDs.

In some embodiments, two or more HSDs like HSD 40, or configured differently, are aligned in series, and are used to promote further reaction. Operation of the mixers may be in either batch or continuous mode. In some instances in which a single pass or "once through" process is desired, the use of multiple HSDs in series may also be advantageous. In embodiments, the reactants pass through multiple HSDs 40 in serial or parallel flow. For example, in embodiments, product in outlet line 19 is fed into a second HSD. When multiple HSDs 40 are operated in series or in parallel, additional reactants and/or carrier (liquid or gaseous) may be injected into the inlet feedstream of each HSD. For example, different dispersible gas, such as hydrogen, carbon dioxide, and/or carbon monoxide may be introduced into a second or subsequent HSD 40. In embodiments, gas comprising oxygenate is injected into the inlet feedstream. For example, gas comprising carbon monoxide, carbon dioxide, oxygen, light alcohols, or a combination thereof may be introduced into the inlet of each in a series or parallel arrangement of HSDs.

Advantages.

The disclosed process for the production of value-added products from light gases provide increased conversion rate from light gases and generate valuable products. Extracting unreacted gases from the liquid phase reduces and minimizes coking in further processing.

Value-added product will generally comprise at least one component selected from oxygenates and olefins. In embodiments, value-added product comprises at least one alcohol. The alcohol may comprise ethanol, propanol, isopropanol, butanol, or a combination thereof.

The rate of chemical reactions involving liquids, gases and solids depend on time of contact, temperature, and pressure. In cases where it is desirable to react two or more raw materials of different phases (e.g. solid and liquid; liquid and gas; solid, liquid and gas), one of the limiting factors controlling the rate of reaction involves the contact time of the reactants. When reaction rates are accelerated, residence times may be decreased, thereby increasing obtainable throughput.

In the case of heterogeneously catalyzed reactions there is the additional rate limiting factor of having the reacted products removed from the surface of the solid catalyst to permit the catalyst to catalyze further reactants. Contact time for the reactants and/or catalyst is often controlled by mixing which provides contact with reactants involved in a chemical reaction.

Not to be limited by theory, it is known in emulsion chemistry that sub-micron particles, or bubbles, dispersed in a liquid undergo movement primarily through Brownian motion effects. Such sub-micron sized particles or bubbles may have greater mobility through boundary layers of solid catalyst particles, thereby facilitating and accelerating the catalytic reaction through enhanced transport of reactants.

The intimate contacting of reactants within HSD may result in faster and/or more complete reaction of reactants. In embodiments, use of the disclosed process comprising reactant mixing via external HSD allows use of reduced quantities of catalyst than conventional configurations and methods and/or increases the product yield and/or the conversion of reactants. In embodiments, the method comprises incorporating external HSD into an established process thereby reducing the amount of catalyst required to effect desired reaction(s) and/or enabling an increase in production throughput from a process operated without HSD, for example, by reducing downtime involved in replacement of catalyst in a conventional slurry bed reactor. In embodiments, the disclosed method reduces operating costs and/or increases production from an existing process. Alternatively, the disclosed method may reduce capital costs for the design of new processes.

Without wishing to be limited to a particular theory, it is believed that the level or degree of high shear mixing may be sufficient to increase rates of mass transfer and also produce localized non-ideal conditions (in terms of thermodynamics) that enable reactions to occur that would not otherwise be expected to occur based on Gibbs free energy predictions. Localized non ideal conditions are believed to occur within the HSD resulting in increased temperatures and pressures with the most significant increase believed to be in localized pressures. The increases in pressure and temperature within the HSD are instantaneous and localized and quickly revert back to bulk or average system conditions once exiting the HSD. Without wishing to be limited by theory, in some cases, the HSD may induce cavitation of sufficient intensity to dissociate one or more of the reactants into free radicals, which may intensify a chemical reaction or allow a reaction to take place at less stringent conditions than might otherwise be required. Cavitation may also increase rates of transport processes by producing local turbulence and liquid micro-circulation (acoustic streaming). An overview of the application of cavitation phenomenon in chemical/physical processing applications is provided by Gogate et al., "Cavitation: A technology on the horizon," *Current Science* 91 (No. 1): 35-46 (2006). The HSD of certain embodiments of the present system and methods may induce cavitation whereby one or more reactant is dissociated into free radicals, which then react. In embodiments, the extreme pressure at the tips of the rotors/stators leads to liquid phase reaction, and no cavitation is involved.

While preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, and so forth). Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, and the like.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the preferred embodiments of the present invention. The disclosures of all patents, patent applications, and publications cited herein are hereby incorporated by reference, to the extent they provide exemplary, procedural or other details supplementary to those set forth herein.

What is claimed is:

1. A method of producing value-added product from light gases, the method comprising:
   (a) providing light gases comprising at least one compound selected from the group consisting of C1-C6 compounds and combinations thereof;
   (b) intimately mixing the light gases with a liquid carrier in a high shear device to form a dispersion of gas in the liquid carrier, wherein the dispersion is supersaturated with said light gases and comprises gas bubbles at least some of which have a mean diameter of less than or equal to about 5 micron(s);
   (c) allowing the value-added product to form and utilizing vacuum to extract unreacted light gases from the liquid carrier; and
   (d) extracting the value-added product and utilizing vacuum to extract light gases embedded in the value-added product;
   wherein the value-added product comprises at least one component selected from the group consisting of higher hydrocarbons, hydrogen, olefins, alcohols, aldehydes, and ketones.

2. The method of claim 1 further comprising recycling the extracted unreacted light gases.

3. The method of claim 1 wherein at least a portion of the liquid carrier is converted into the value-added product.

4. The method of claim 1 wherein the liquid carrier comprises a catalyst.

5. The method of claim 1, wherein (b) further comprises contacting the light gases and the liquid carrier with a catalyst.

6. The method of claim 1 further comprising contacting the liquid carrier and the light gases with a catalyst selected from the group consisting of hydrogenation catalysts, hydroxylation catalysts, partial oxidation catalysts, hydrodesulfurization catalysts, hydrodenitrogenation catalysts, hydrofinishing catalysts, reforming catalysts, hydration catalysts, hydrocracking catalysts, Fischer-Tropsch catalysts, dehydrogenation catalysts, and polymerization catalysts.

7. The method of claim 6, wherein the catalyst comprises at least one component selected from the group consisting of phosphoric acid, sulfonic acid, sulfuric acid, zeolites, solid acid catalysts, and liquid acid catalysts.

8. The method of claim 1 wherein utilizing vacuum to extract unreacted light gases from the liquid carrier reduces coking when the liquid carrier is recycled or further processed.

9. The method of claim 1 further comprising utilizing a high shear rate greater than 20,000 $s^{-1}$.

10. The method of claim 1 wherein utilizing vacuum to extract light gases embedded in the value-added product reduces or eliminates carbon generation.

* * * * *